(12) United States Patent
Cazzanti et al.

(10) Patent No.: US 8,506,274 B2
(45) Date of Patent: Aug. 13, 2013

(54) APPARATUS FOR MANUFACTURING TYRES FOR VEHICLE WHEELS

(75) Inventors: Stefano Cazzanti, Milan (IT); Alfredo Balini, Milan (IT)

(73) Assignee: Pirelli Tyre S.p.A., Milano (IT)

( * ) Notice: Subject to any disclaimer, the term of this patent is extended or adjusted under 35 U.S.C. 154(b) by 4 days.

(21) Appl. No.: 13/225,701

(22) Filed: Sep. 6, 2011

(65) Prior Publication Data

US 2012/0027880 A1 Feb. 2, 2012

Related U.S. Application Data

(62) Division of application No. 11/793,040, filed as application No. PCT/IT2004/000731 on Dec. 28, 2004, now Pat. No. 8,048,247.

(51) Int. Cl.
*B29C 33/10* (2006.01)

(52) U.S. Cl.
USPC .......................................... 425/28.1; 425/812

(58) Field of Classification Search
USPC .................. 425/28.1, 35, 472, 812; 249/141
See application file for complete search history.

(56) References Cited

U.S. PATENT DOCUMENTS

| | | | | | |
|---|---|---|---|---|---|
| 4,351,789 | A | * | 9/1982 | Sidles et al. | 425/28.1 |
| 4,492,554 | A | * | 1/1985 | Carter | 425/28.1 |
| 5,922,237 | A | * | 7/1999 | Green | 425/28.1 |
| 5,939,101 | A | * | 8/1999 | Green | 425/28.1 |
| 6,871,831 | B1 | * | 3/2005 | Cuny et al. | 249/141 |
| 6,923,629 | B2 | * | 8/2005 | Ahn et al. | 425/28.1 |
| 8,123,508 | B2 | * | 2/2012 | Hajduch | 425/28.1 |
| 2002/0162941 | A1 | | 11/2002 | Hanya | |

FOREIGN PATENT DOCUMENTS

| | | |
|---|---|---|
| AU | 1996-71784 B2 | 5/1997 |
| CA | 2190720 | 5/1997 |
| DE | 195 43 276 C1 | 2/1997 |
| DE | 199 23 952 A1 | 12/1999 |
| EP | 1 380 397 B1 | 1/2004 |
| GB | 922788 | 4/1963 |
| GB | 2 339 163 A | 1/2000 |
| WO | WO 2004/045837 | 6/2004 |
| WO | WO 2006/070411 A1 | 7/2006 |

OTHER PUBLICATIONS

Ishida, "Valve Construction for Degassing Device of Injection Molding Machine", Patent Abstracts of Japan, of JP Publication No. 04123859, Publication Date Apr. 23, 1992.

Komatsu, "Mold for Injection Molding", Patent Abstracts of Japan, of JP Publication No. 03173621, Publication Date Jul. 26, 1991.

(Continued)

*Primary Examiner* — James Mackey
(74) *Attorney, Agent, or Firm* — Finnegan, Henderson, Farabow, Garrett & Dunner, L.L.P.

(57) ABSTRACT

In a method for manufacturing tires for vehicle wheels, a green tire, once formed, is transferred into a vulcanization mold and pressed against the holding walls of a molding cavity. Concurrently with the pressing step, a fluid present between the green tire and the holding walls is evacuated through vent valves. The tire is brought into contact with the closing head of each valve so as to push it toward a closed position of the valve itself. The closing head has a distal portion facing the molding cavity and includes at least one grip element for the tire blend, so that the closure member is pulled toward the open position while the molded and cured tire is moved away from the inner surface of the molding cavity.

32 Claims, 5 Drawing Sheets

(56) References Cited

OTHER PUBLICATIONS

Ueda et al., "Die for Vulcanizing Molded Rubber Article", Patent Abstracts of Japan, of JP Publication No. 02214616, Publication Date Aug. 27, 1990.

Ishida, "Gas Venting Device for Low Speed Casting", Patent Abstracts of Japan, of JP Publication No. 07001103, Publication Date Aug. Jan. 6, 1995.

Notice of Preliminary Rejection issued Aug. 9, 2011 by the Korean Patent Office in corresponding Korean Patent Application No. 10-2007-7011694 (3 pages).

English-language translation of Notice of Preliminary Rejection issued Aug. 9, 2011 by the Korean Patent Office in corresponding Korean Patent Application No. 10-2007-7011694 (2 pages).

* cited by examiner

APPARATUS FOR MANUFACTURING TYRES FOR VEHICLE WHEELS

This is a divisional of application Ser. No. 11/793,040, filed Aug. 7, 2008 and issued as U.S. Pat. No. 8,048,247, which is a national phase application based on PCT/IT2004/000731, filed Dec. 28, 2004, both of which are incorporated herein by reference.

The present invention relates to a method and an apparatus for manufacturing tyres for vehicle wheels.

Generally, in tyre manufacture for vehicles wheels, subsequently to a step of building a green tyre through assembling of respective components of elastomeric material some of which are provided with suitable reinforcing structures, a moulding and curing treatment is provided to be carried out to the aim of causing structural stabilisation of the tyre through cross-linking of the elastomeric components of same and, as generally required, of impressing a desired tread pattern into the tyre itself, as well as possible distinctive graphic marks at the tyre sidewalls.

To this aim, the green tyre is introduced into a suitably heated vulcanisation mould, having a moulding cavity conforming in shape to the final conformation to be given to the tyre itself. After carrying out closure of the mould, the green tyre is pressed against the holding walls of the moulding cavity and the heat required for tyre vulcanisation is simultaneously transmitted thereto. To reach this purpose, for example, expansion of a bladder of toroidal conformation is caused within the tyre through admission of steam under pressure into said bladder, so as to bring the bladder into contact with the inner surface of the tyre and compress the latter against the holding walls of the moulding cavity.

When vulcanisation has been completed, the mould is opened to enable removal of the tyre and arrange the mould for a new moulding/vulcanisation cycle.

Once the green tyre has been introduced into the mould, in order to prevent air pockets or pockets of other fluid possibly used in the vulcanisation process from being entrapped between the holding walls of the moulding cavity and the outer surface of the green tyre, the moulds of the conventional type are provided with a plurality of venting ducts passing through the mould wall and opening into the moulding cavity, said ducts lying at right angles to the holding walls of said moulding cavity. These ducts during the step of pressing the tyre against the holding walls of the moulding cavity, enable evacuation of possible air pockets and ensure a perfect adhesion of the outer surface of the green tyre to the holding walls of the moulding cavity. Adoption of ducts passing through and opening into the moulding cavity however, involves a plurality of problems due to seeping of the green-tyre blend into the ducts themselves during the moulding step. In fact, the blend entrapped in the ducts is subjected to vulcanisation and forms a plurality of threadlike outgrowths on the finished tyre that are known in the specific technical field as "flashes" or "burrs" and are generally removed in a work station dedicated to this purpose, when the tyre production process has been completed. Alternatively, these threadlike outgrowths are not removed from the outer surface of the finished tyre and in this case they involve worsening of the aesthetic-qualitative level of said tyre.

The state of the art proposes many solutions aiming at reducing formation of these threadlike outgrowths.

For example, in document CA-2,190,720 use of a movable valve is provided that is inserted in each of the holes formed in the mould walls, said valve comprising a stem and a closing head associated with said stem. The closing head has a frustoconical shape provided with a flat surface facing the inside of the moulding cavity. A return spring pushes the valve to the open position at which the closing head lies spaced apart from a respective seat of a mating shape, designed to receive said stem and closing head. The valve is forced to the closed position by virtue of the thrust exerted thereon by the tyre blend during the moulding step and comes back to the open position when the tyre is removed from the mould.

Document GB-2,339,163 discloses a venting device comprising a closing element slidably disposed within a main body of said device. A first and a second springs enable movement of the closing element—relative to the main body—so as to allow opening and closing of the device. At the inner surface of the moulding cavity, the main body of the device is provided with a cone-shaped seat. At the upper end of the closing element there is a closing surface of conical shape, matching the shape of the cone-shaped seat of the main body of the device. Closure of the valve takes place when the cone-shaped seat and closing surface are engaged with each other through movement of the closing element within the main body.

Document EP-1,380,397 discloses a venting apparatus positioned in a vent opening of a mould. Said apparatus comprises: a venting duct; a valve body inserted in said duct; a spring surrounding a lower portion of the valve body to supply said valve body with an elastic force; and a retainer in engagement with a lower end portion of the valve body to control vertical displacement of the valve itself. The inner diameter of the venting duct gradually increases towards the moulding cavity to define a tapered shape. In addition, the valve body has a frustoconical closing head provided with an inclined lower surface the inclination of which is different from the inclination of the inner wall of the venting duct. In this manner, when the closing head comes into contact with the inner surface of the duct, contact does not take place along a surface but along a circumference because in radial section the contact between the lower surface of the closing head and the inner surface of the duct is of the punctual type.

The Applicant has ascertained that, following the vulcanisation process, the blend seeping into the evacuation duct of the vent valve, tends to settle at least partly in the contact region between the closing head of the valve and the respective valve seat (i.e. the inner wall of the duct). This situation is particularly disadvantageous because, due to the presence of this blend, the closing head and the wall of the duct tend to glue together until, after repeated cycles, a definitive stoppage of the valve occurs and, as a result, said valve needs to be replaced in order to restore a correct evacuation of the air from the moulding cavity.

The Applicant has therefore perceived the necessity to increase the thrust required for carrying out opening of the valve at the end of each vulcanisation cycle, i.e. when the finished tyre (moulded and cured) is extracted from the mould, in order to avoid or at least reduce the risk of stoppage of the valve itself.

The Applicant has further ascertained that, in the open position, the lower tapered portion of the closing head of the known art valves (the above described valves, for example) faces the inside of the moulding cavity and greatly projects relative to the inner surface of said cavity, this surface being defined by the holding walls of said moulding cavity. This aspect is particularly disadvantageous because in some regions of the mould, in particular at the mould regions designed to form the tyre shoulders, the blend tends to flow tangential to the mould wall and to approach the valve head in a lateral direction relative to said valves. In this way the blend exerts a side thrust on the lower tapered portion of the closing head, this thrust generating a force directed to move the closing head away from the valve seat and to open the valve itself instead of closing it. Therefore, this force counteracts the thrust exerted by the blend approaching the closing head in a direction perpendicular to the inner wall of the moulding cavity and aimed at carrying out the valve closure.

The Applicant has further noticed that the presence of blend interposed between the closing head and the seat of the valve compromises a correct closure of the valve itself and brings to formation of faults on the finished product. Repetition of this phenomenon during subsequent vulcanisation cycles further involves an increasingly greater storage of cured blend within the valve, so that, cycle after cycle, an unavoidable stoppage of the valve itself will be caused.

Finally, the Applicant has ascertained that the side thrust of the blend on the closing head of the valve can cause misalignment of the valve stem relative to the duct in which the valve slides. Since a passage port necessary to enable the air to flow out of the moulding cavity is defined between the stem and duct, the amount of the stem inclination—due to the above described side force—can be of such a value that sliding of the valve within the valve seat and a correct air flow are impaired.

The Applicant has therefore perceived the necessity to provide the mould with vent valves capable of preventing, or at least greatly reducing, blend seepage into the ducts of said valves and therefore avoid stoppage of same, as well as formation of the above mentioned threadlike outgrowths generally found in the known art embodiments.

The Applicant has found that the above mentioned problems can be eliminated or at least greatly reduced by arranging on the closing head of the valve, a region of engagement with the tyre blend in such a manner that, when the finished tyre is moved away from the inner surface of the mould, the tyre itself co-operates in this operation by exerting a pulling action on the closing head of the valve towards the closed position of the mould. In this way, opening of the mould helps in carrying out the possible separation of the closing head of the valve from the respective seat.

The Applicant has further found that it is advantageously possible to greatly limit the projection of the closure member head towards the inside of the moulding cavity and therefore, as a result, to remarkably reduce blend seepages at the inside of the valve duct even when the blend reaches said valve by its tangential movement along the holding walls of the moulding cavity, carrying out coupling between the valve seat and the closure member head of said valve in such a manner that, at least in the closed position, the closure member head keeps at least partly embedded in the mould wall.

The Applicant has further found that the above problems can be advantageously solved even when the closure member head keeps at least partly embedded in the mould wall also in the open position of the valve itself.

In a first aspect, the invention relates to a method of manufacturing tyres for vehicle wheels, comprising the steps of:
a) forming a green tyre;
b) closing the green tyre in a vulcanisation mould, the holding walls of said mould defining an inner surface of a moulding cavity, said inner surface conforming in shape to the final conformation to be given to the green tyre;
c) pushing the green tyre towards said holding walls of said mould;
d) evacuating a fluid present between an outer surface of said green tyre and the holding walls of said mould, said evacuating step comprising the steps of:
 d1) arranging at least one vent valve in said holding walls, said vent valve comprising a duct having an inlet end opening onto said inner surface of said moulding cavity and a closure member having a closing head which is axially movable relative to said duct; and
 d2) transferring said fluid from the moulding cavity to the duct through a connecting passage confined between an inner wall of said duct and the closing head of the closure member set to an open position;
e) bringing the green tyre into contact with the closing head of the closure member to push the latter into the duct so as to achieve the closed condition of said at least one vent valve and to mechanically engage the green tyre with at least one grip element set on said closing head;
f) opening the vulcanisation mould in such a manner as to separate the moulded tyre from the inner surface of said moulding cavity and to exert a pulling action on said grip element by the tyre to bring the closure member back to the open position.

In a further aspect the invention relates to an apparatus for manufacturing tyres for vehicle wheels, comprising:
 devices designed to form a green tyre;
 at least one vulcanisation mould, the holding walls of said mould defining an inner surface of a moulding cavity, said inner surface conforming in shape to the final conformation to be given to the green tyre, and
 said vulcanisation mould comprising a plurality of vent valves for said moulding cavity, at least one of said valves comprising:
  a duct having an inlet end opening onto said inner surface of said moulding cavity, and
  a closure member having a closing head that is axially movable relative to the duct between:
  a closed position, at which said closing head forms a contact seat with an inner wall of said duct, said contact seat being defined in said inlet end, and
  an open position, at which said closing head and inner wall of said duct confine a passage for connection with said moulding cavity,
said closing head having at least one grip element to be mechanically engaged with the green tyre pressed against the inner surface of the moulding cavity in order to bring the closure member back to the open position when the tyre is separated from said inner surface.

Further features and advantages will become more apparent from the detailed description of a preferred but not exclusive embodiment of a method and an apparatus for manufacturing tyres in accordance with the present invention.

This description will be set out hereinafter with reference to the accompanying drawings given by way of non-limiting example, in which:

FIG. 1 diagrammatically shows in diametrical section, one half of a vulcanisation mould being part of an apparatus for manufacturing tyres for vehicle wheels in accordance with the present invention;

Figure 1:
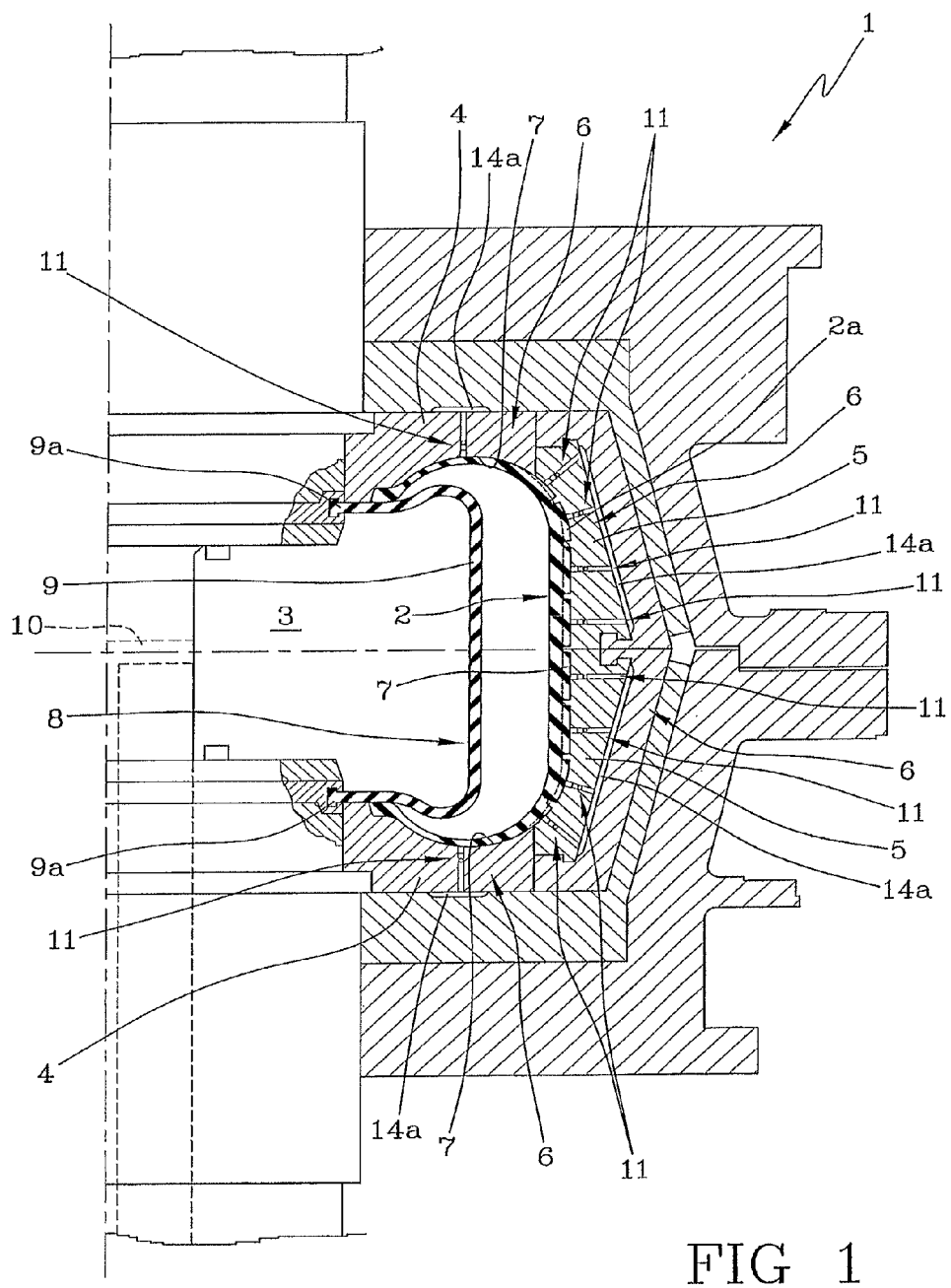

With reference to FIG. 1, a vulcanisation mould belonging to an apparatus for manufacturing tyres for vehicle wheels in accordance with the present invention has been generally denoted at 1.

This apparatus generally comprises devices adapted to form a green tyre 2 and devices capable of transferring the green tyre 2 into a moulding cavity 3 of the vulcanisation mould 1. Said tyre-forming and transferring devices are neither shown nor further described as they can be made in any convenient manner.

As shown in FIG. 1, the vulcanisation mould 1 has a pair of axially opposite cheeks 4 and a plurality of circumferential sectors 5 that, when the mould is closed, define the holding walls 6 of the moulding cavity 3. The holding walls 6 delimit an inner surface 7 of the moulding cavity 3 the shape of which matches the final conformation to be given to the tyre. The green tyre 2, once closed in mould 1, is pressed against the holding walls 6 by a suitable device 8. Subsequently, or simultaneously with the pressing step, heat is administered to the green tyre 2 that is pressed against the holding walls 6.

By effect of pressing, suitable ridges set on sectors 5 and cheeks 4 cause formation of a desired pattern on the tread band 2a of the tyre, as well as of a plurality of distinctive graphic marks on the tyre sidewalls. The administered heat causes cross-linking of the elastomeric material of which the tyre is made up. When a cycle has been completed, the finished tyre (i.e. moulded and cured) is extracted from the previously opened mould 1.

Shown in FIG. 1 by way of example is a pressing device 8 comprising a bladder 9 of substantially toroidal conformation having two circumferential edges carrying respective anchoring tailpieces 9a to be sealingly engaged in mould 1. A duct 10 for feeding steam or other working fluid and formed in mould 1 opens into bladder 9 so as to enable expansion of the latter following admission of steam under pressure and to cause compression of the green tyre 2 against the cheeks 4 and sectors 5. Also operatively associated with mould 1, at the cheeks 4 and/or sectors 5, are devices designed to supply heat to the green tyre 2 to be cured, which preferably co-operate with the steam introduced into the expandable bladder 9.

The vulcanisation mould 1 further comprises at least one vent valve 11 for the moulding cavity 3 which performs the function of, concurrently with the pressing step, evacuating air pockets or pockets of other fluid possibly used in the vulcanisation process, that are present between the green tyre 2 and holding walls 6.

As better shown in FIG. 1, the vulcanisation mould 1 comprises a plurality of vent valves 11, preferably mounted at the regions of mould 1 close to the tyre shoulders and crown region.

Figure 2:
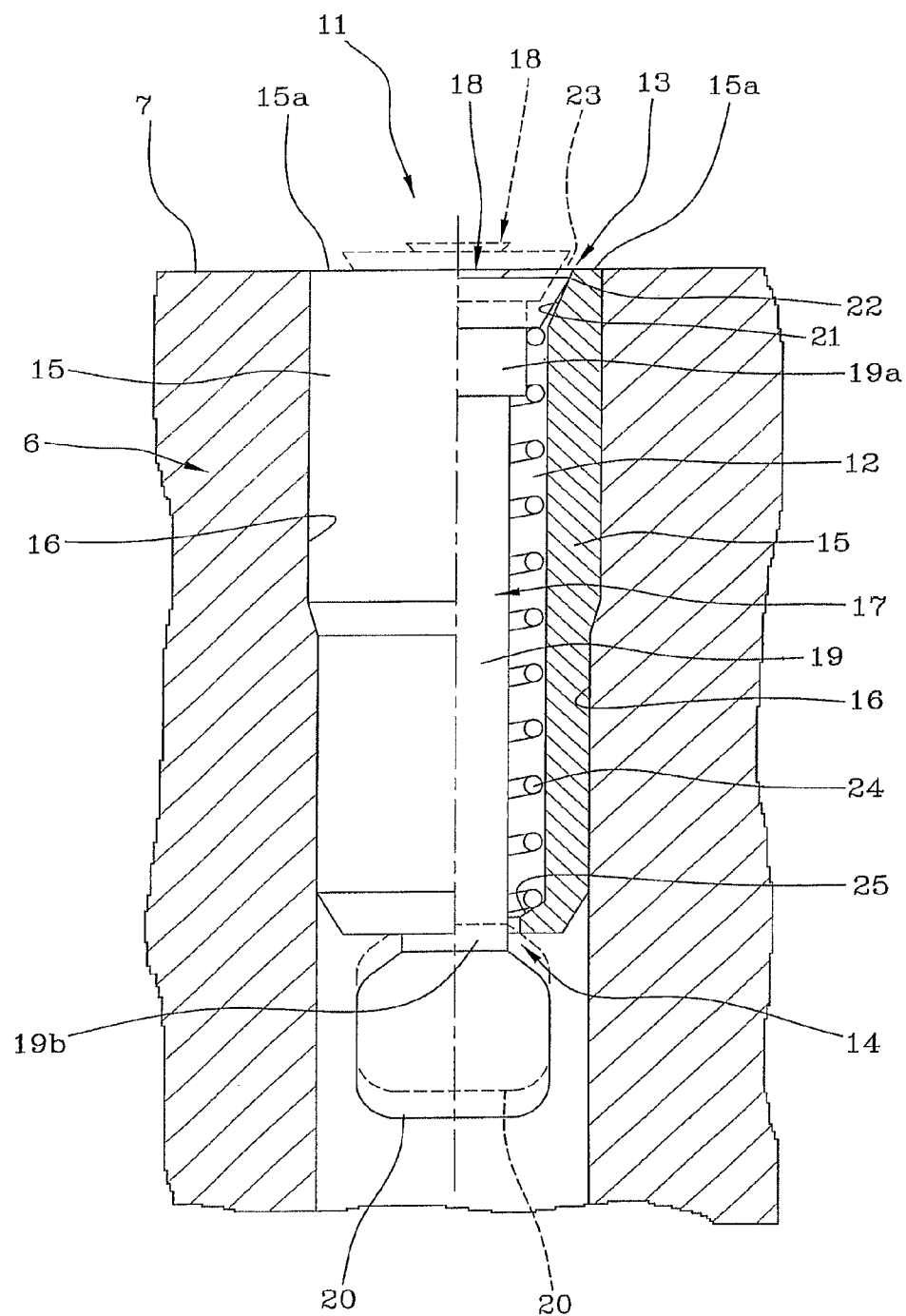
FIG. 2 is a partial section showing a vent valve according to a first embodiment.

Referring particularly to FIG. 2, each valve 11 comprises a duct 12 having an inlet end 13 opening onto the inner surface 7 of the moulding cavity 3 and an outlet end 14 opposite to the inlet end 13 and opening outwards of mould 1, through suitable evacuation chambers 14a (shown in FIG. 1), for example. For conveying the air out of the moulding cavity 3, the evacuation chambers 14a communicate with the external environment of said cavity by means of channels not shown in FIG. 1.

Duct 12 is preferably defined along a valve body 15 inserted in an opening 16 formed in the holding wall 6. The valve body 15 is mounted flush with the inner surface 7 of the moulding cavity 3 in such a manner that an edge 15a of the valve body 15 close to the inlet end 13 is substantially coplanar with said inner surface 7.

Valve 11 further comprises a closure member 17 provided with a closing head 18 axially movable relative to duct 12. The closing head 18 is rigidly connected to a stem 19 which is axially and slidably inserted in duct 12. Stem 19 brings the closing head 18 close to a first end 19a positioned in the vicinity of the inlet end 13 of duct 12. A second end 19b of stem 19, opposite to the first end 19a and placed close to the outlet end 14 of duct 12, carries a retainer 20 disposed externally of the duct itself. The function of retainer 20 is to prevent the closure member 17 from slipping off the duct 12 towards the moulding cavity 3. Preferably, the retainer 20 is obtained through squashing of the second end 19b of stem 19, so as to form a swelling on said end that is sufficient not to allow passage of the latter through the outlet end 14 of duct 12.

The closure member 17 is movable between a closed position and an open position. In the closed position (shown in FIG. 2 in solid line), the closing head 18 forms a contact seat with an inner wall 21 of duct 12, said seat being defined at the inlet end 13, while retainer 20 keeps spaced apart from the outlet end 14. In the open position (represented in FIG. 2 in chain line), the closing head 18 and the inner wall 21 of duct 12 are mutually spaced apart and confine a passage 23 for connection with the moulding cavity 3. In this configuration, the retainer 20 lies in contact with the outlet end 14.

A helical spring 24 is disposed around stem 19 and is interposed between the closing head 18 and an abutment surface 25 formed at the inside of duct 12, preferably close to the outlet end 14. Spring 24 pushes the closing head 18 to the open position, while the retainer 20 holds the closure member 17 in duct 12.

Before the pressing step and during the starting moments of this step, the green tyre 2 does not fully adhere to the holding walls 6 of the vulcanisation mould 1 and keeps at least partly separated therefrom. Under this situation, the vent valves 11 are maintained open by effect of springs 24. Compression of the green tyre during the moulding step (for example by means of the pressing device 8) and consequent approaching of the green tyre 2 towards the holding walls 6 causes evacuation through the open valves 11, of the air (or other fluid) present between the holding walls 6 of the moulding cavity 3 and the outer surface of the green tyre 2. Said air is transferred from the moulding cavity 3 to duct 12 through the connecting passage 23 and therefrom into the evacuation chambers 14a. During the pressing step the green tyre 2 is brought into contact with the closing head 18 of the vent valve 11, pushing the closure member 17 into duct 12 and causing closure of valve 11, against the action of spring 24, so as to obstruct the connecting passage 23.

Advantageously, the closing head 18 and the inlet end 13 of duct 12 are such shaped that, in the closed position (identified with a solid line in FIG. 3), the contact seat 22 is spaced apart from the inner surface 7 of the moulding cavity 3, so that an embedding recess 26 is defined between the inner surface 7 and the closing head 18 of the closure member 17. In other words, in the closed position, the closing head 18 keeps at least partly embedded in the inner surface 7.

To this aim, in the preferred embodiments shown in FIGS. 2-5, the closing head 18 has a peripheral edge 27 that, when valve 11 is in the closed position, rests against the wall 21 of duct 12 so as to delimit the contact seat 22. The contact seat 22 lies in a support plane 28 that is offset relative to the inner surface 7 of the moulding cavity 3 by an embedding distance "$d_1$". Preferably, this embedding distance "$d_1$" is included between 0.15 mm and 0.25 mm. As clearly shown in FIGS. 3, 4 and 5, the bottom surface of the embedding recess 26 is made up of the closing head 18 and a surface portion of the inner wall 21 of duct 12 included between the closing head 18 and the inner surface 7 of the moulding cavity 3.

In order to obtain the embedding recess 26 when valve 11 is in the closed position, the inlet end 13 of duct diverges towards the moulding cavity 3 and opens onto the inner surface 7 at an opening 29 the transverse sizes of which are greater than the peripheral edge 27 of the closing head 18. In the embodiments shown, the peripheral edge 27 and opening 29 of duct 12 are of circular shape (in cross section) and the diameter of the edge 27 is smaller than that of opening 29.

Advantageously, the closing head 18 has a proximal portion 30 designed to engage into the inlet end 13 and on top of which there is a thrust surface 31 facing the moulding cavity 3.

The diverging inlet end 13 has a first angle $\alpha_1$ defined by the summit angle of the cone tangent to the inner wall 21 of duct 12. The proximal portion 30 tapers towards stem 19 and has a second angle $\alpha_2$ defined by the summit angle of the cone tangent to the proximal portion itself. The first and second angles $\alpha_1$, $\alpha_2$ have different widths from each other. In particular, at least at the contact seat 22 (i.e. in the closed position of valve 11), the first angle $\alpha_1$ is advantageously smaller than the second angle $\alpha_2$ in such a manner that the contact seat 22 is substantially defined (in the corresponding cross section) by a circumferential line. The mutual contact between the closing head 18 and the contact seat 22 following a circumferential line enables the possible occurrence of gluing phenomena to be avoided or at least greatly limited, between the closing head and inner wall of the duct, due to formation of important thicknesses of cured blend.

Preferably, at least at the contact seat 22, the first angle $\alpha_1$ has a value included between 55° and 65°.

Preferably, at least at the contact seat 22, the second angle $\alpha_2$ has a value included between 75° and 85°.

Figure 3:
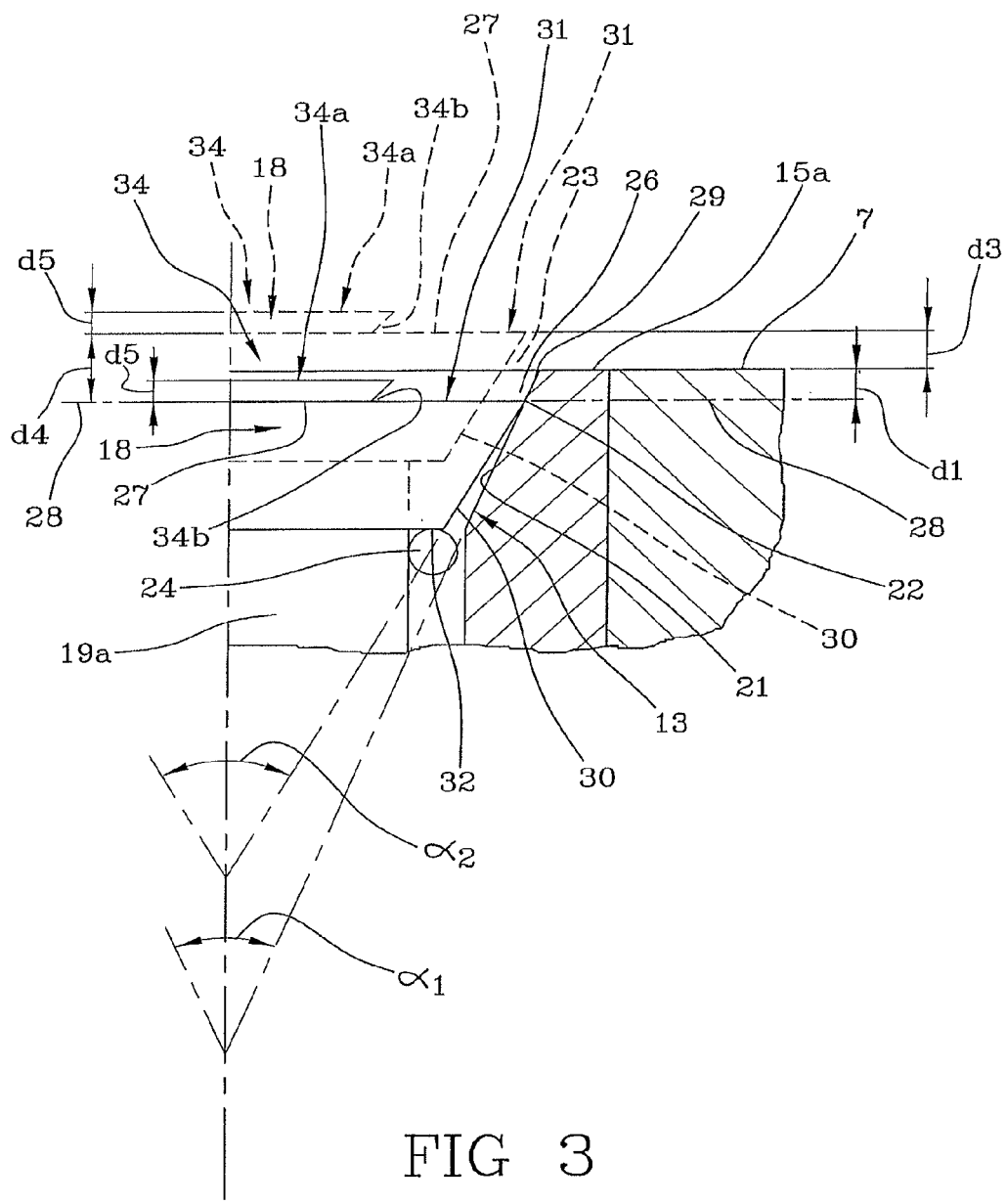
FIG. 3 shows an enlarged portion of the valve in FIG. 2.

As pointed out in the embodiment shown in FIGS. 2 and 3, the inlet end 13 of duct 12 has a frustoconical conformation (in the corresponding cross section). The proximal portion 30 too of the closing head 18 has a frustoconical conformation, the major base of which is delimited by the peripheral edge 27. Preferably, the summit angle $\alpha_1$ of the cone to which the frustum of cone of the inlet end 13 belongs is smaller than the summit angle $\alpha_2$ of the cone to which the frustum of cone of the proximal portion 30 belongs. Preferably, the diameter of stem 19 is smaller than the diameter of the minor base of the proximal portion 30, and an annular surface on which an end of the helical spring 24 rests is defined between the stem 19 and said proximal portion 30.

Figure 4:
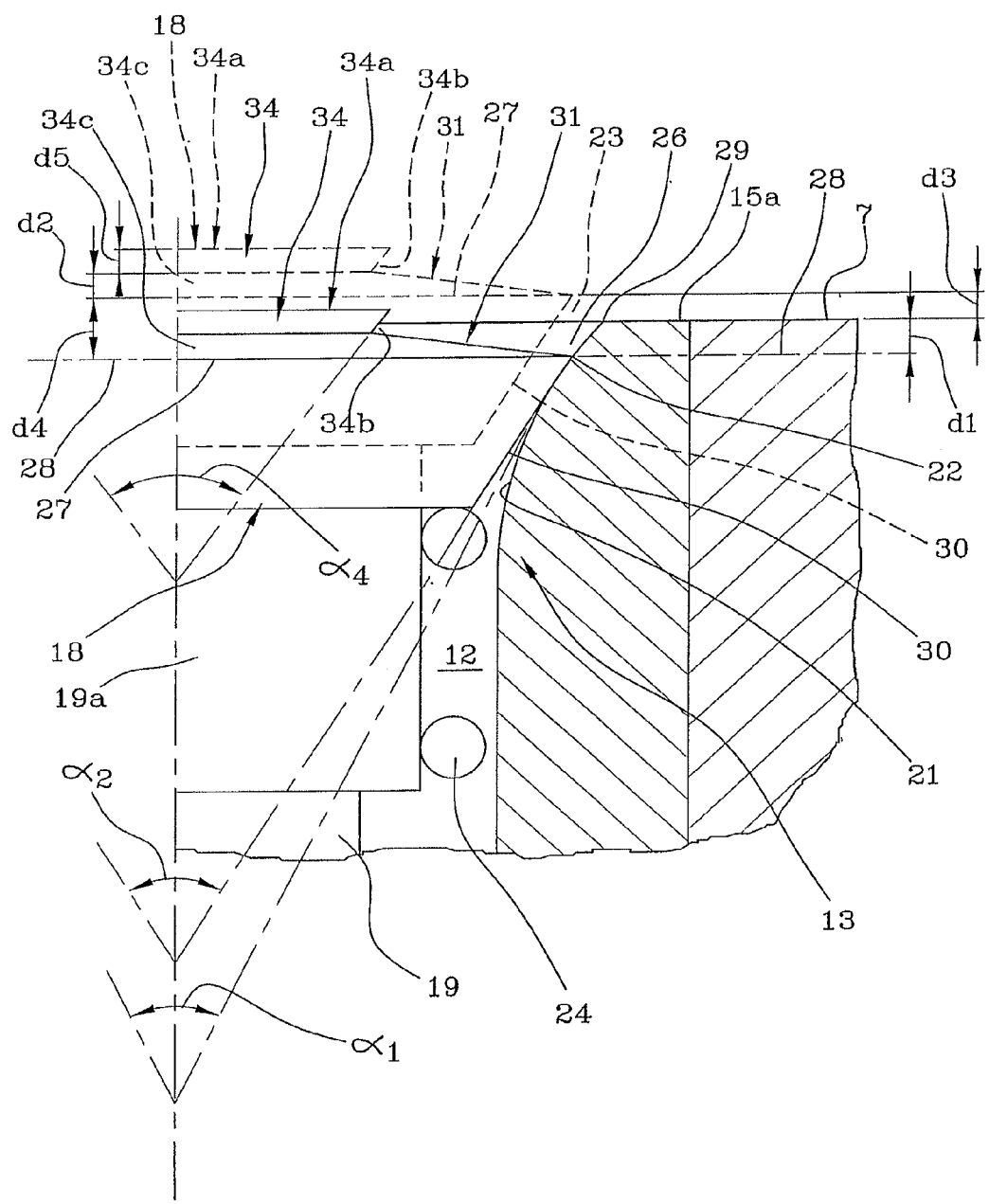
FIG. 4 shows an enlarged portion of a vent valve made in accordance with a second embodiment.

Shown in FIG. 4 is a further embodiment, different from the one seen in FIG. 3. In detail, the alternative embodiment in FIG. 4 differs from the valve in FIG. 3 because the inlet end 13 diverges according to a curvilinear profile and opens in a flaring shape towards the moulding cavity 3. In this configuration, at the circumferential contact seat 22, the summit angle $\alpha_1$ of the cone tangent to duct 12 is smaller than the summit angle $\alpha_2$ of the cone to which the frustum of cone of the proximal portion 30 belongs.

Figure 5:
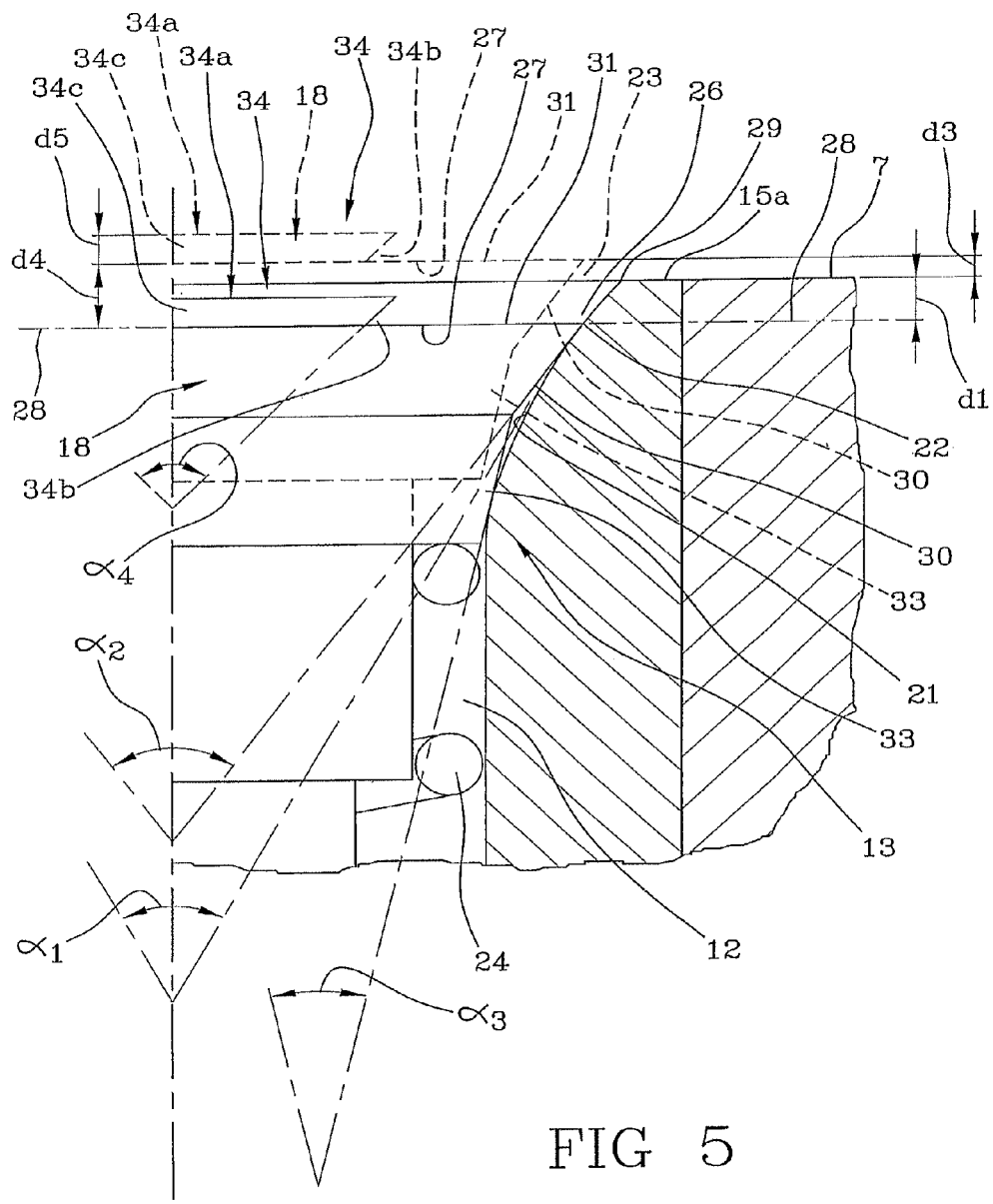
FIG. 5 shows an enlarged portion of a vent valve made in accordance with a further embodiment.

Shown in FIG. 5 is a further embodiment different from that shown in FIG. 4. In detail, the alternative embodiment in FIG. 5 shows the inlet end 13 with a curvilinear profile as that in FIG. 4 and the closure member 17 comprises an intermediate portion 33 extending in the continuation of the proximal portion 30. The intermediate portion 33 tapers towards stem 19 following a third angle $\alpha_3$ of a value smaller than the second angle $\alpha_2$. Preferably, the third angle $\alpha_3$ has a value included between 55° and 65°. Adoption of a summit angle $\alpha_3$ of a particularly reduced value enables displacement of the head 18 from the inner wall 21 of duct 12 to be limited, the lift of the closing head 18 of valve 11 being the same, and as a result, enables the closure member 17 to be guided within duct 12 in a more careful manner, so that misalignments of important amount of the closure member relative to the duct are avoided. In other words, the intermediate portion 33 disposed in the extension of the proximal portion 30 gives the closure member 17 such a guide action that said member is not submitted to too marked inclinations and the smooth sliding of the latter in duct 12 is improved.

Alternatively, according to further variant embodiments not shown, the proximal portion 30 of the closing head 18 and possibly also the intermediate portion 33, if present, can have a tapered configuration of curvilinear profile.

In addition, still within the scope of the present invention, it is possible to provide coupling of a closing head 18 with double taper, as shown in FIG. 5, with an inlet end 13 having a frusto-conical conformation, as shown in FIG. 3.

Alternatively, coupling of a closing head 18 of a curvilinear profile with an inlet end 13 of a curvilinear profile can be provided, as shown in FIG. 4.

The thrust surface 31 of the closing head 18 carries a grip element 34a that, together with the thrust surface itself, identifies a distal portion 34 of the closing head 18. In the embodiments shown in FIGS. 2, 3 and 5, the thrust surface 31 is flat.

Alternatively, as shown in FIG. 4, the thrust surface 31 of the closing head 18 is convex and tapers towards the moulding cavity 3 following a frustoconical shape, for example.

As an alternative, the convex surface 31 of the closing head 18 has the shape of a portion of a spherical cap.

In the frustoconical shape, the thrust surface 31 has a major base coupled with the major base of the proximal portion 30 of the closing head 18 and delimited by the same peripheral edge 27 as the latter. The minor base of the thrust surface 31 carries the grip element 34a lying spaced apart from the plane containing the peripheral edge 27 of the closing head 18 by a predetermined distance "$d_2$". Preferably, this distance "$d_2$" is included between 0.1 mm and 0.15 mm. Due to the inclination of the convex surface 31 relative to the inner surface 7 of the moulding cavity 3, the side thrust exerted by the blend moving along a direction tangential to the mould surface (i.e. to the inner surface 7 of the moulding cavity 3) advantageously generates a component of force on the closing head 18 which is directed to duct 12 and therefore tends to close valve 11.

The grip element 34a delimits a grip recess 34b on the distal portion 34 which is designed to be engaged by the blend of the green tyre pushed against the inner surface 7 of the moulding cavity 3. This grip recess 34b is preferably of radial extension. Advantageously this grip recess 34b is defined by an undercut.

In the preferred embodiment illustrated in the figures, the grip element 34a is defined by a frustoconical body having a minor base in engagement with the thrust surface 31 of the closing head 18 and a major base lying spaced apart from the thrust surface 31 by a predetermined distance "$d_5$". The side surface of the frustoconical body 34a delimits, together with the thrust surface 31 of the closing head 18, an annular undercut defining the grip recess 34b designed to be engaged by the blend. The frustoconical body 34a preferably has a summit angle $\alpha_4$ included between 30° and 40°.

When the green tyre 2 is pressed against the inner surface 7 of the holding walls 6 and pushes the closure member 17 causing closure of each valve 11, the elastomeric material of which the tyre is made, still in a raw and particularly fluid state, seeps into the recess 34b where it is cured and solidifies, following administration of heat usually carried out within mould 1. Thus a mechanical engagement is created between tyre 2 and the grip element 34a.

When vulcanisation has been completed and the finished tyre (i.e. moulded and cured) is moved away from the walls of the moulding cavity 3 due to opening of mould 1, the mechanical engagement of the elastomeric material on the closing head 18 causes a pulling action on the grip element 34a dragging the closure member along towards the open position and therefore facilitating the thrust action exerted by spring 24. When the closure member 17 reaches the end of its stroke, limited by the retainer 20, forced disengagement of the tyre from the closing head 18 occurs.

Advantageously, temporary engagement of the blend with the closing head 18 of the vent valve 11, obtained by the grip element 34a, ensures-opening of the closure member 17 even when during the Vulcanisation process gluing of the closing head 18 onto the inlet end 13 of duct 12 has occurred.

In accordance with that which is illustrated in FIGS. 3 and 5, in the closed position the distal portion 34 is fully housed in the embedding recess 26. The major base of the frustoconical body of the grip element 34a is therefore offset relative to the inner surface 7 of the moulding cavity 3 towards duct 12.

Alternatively, in the closed position, the distal portion 34 is flush with the inner surface 7 of the moulding cavity 3.

As an alternative, in the closed position, the distal portion 34 projects relative to the inner surface 7, as shown in the embodiment illustrated in FIG. 4.

In both these situations, the embedding recess 26 takes the shape of an annular recess.

In accordance with the present invention, the lift of valve 11 is of such a nature that, in the open position of the closure member 17, the peripheral edge 27 of the closing head 18 projects relative to the inner surface of the moulding cavity 3 by a greatly reduced separation distance "$d_3$" as compared with the solutions of the known art. Preferably, this separation distance "$d_3$" is smaller than 0.15 mm. In this position, the peripheral edge 27 of the closing head 18 is offset relative to the support plane 28 by a distance "$d_4$" that is greater than the distance between the support plane 28 and the inner surface 7 of the moulding cavity 3, i.e. greater than the embedding distance "$d_1$".

Alternatively and in accordance with an embodiment not shown, in the open position of the closure member 17, the distance "$d_4$" between the peripheral edge 27 and the support plane 28 does not exceed the embedding distance "$d_1$". In this case the peripheral edge 27 keeps within duct 12 (and therefore in the embedding recess 26) even when valve 11 is in the open position.

As above described, coupling between the valve seat and the head of the closure member of said valve is such obtained that, in the closed position, the head of the closure member keeps at least partly embedded in the mould wall. This expedient enables projection of the valve head towards the inside of the moulding cavity to be greatly limited, the valve lift being the same, when the valve is in the open position. In this way the invention, without impairing venting of the air from the moulding cavity, enables elimination of, or great reduction in, the amount of seepage of the blend reaching the head through a tangential movement relative to the surface of the mould. In this manner therefore, both the risk of stoppage of the valve and formation of surface faults on the finished products, such as the above mentioned thread-like outgrowths, are minimised.

In addition, the reduced projection of the closing head of the valve relative to the inner surface of the moulding cavity enables the thrust exerted by the blend tangentially reaching the closing head and tending to move the head away from the valve seat to be eliminated or in any case to be greatly limited.

Finally, the blend reaching the convex surface of the valve head by moving tangentially of the inner surface of the moulding cavity produces a thrust component intended to close the valve. This thrust is to be added to the thrust exerted by the blend approaching the closing head in a direction perpendicular to the inner wall of the moulding cavity and facilitates timely closure of the vent valve, compensating for the tangential thrust exerted by the blend on the lower tapered portion of the closing head.

The invention claimed is:

1. An apparatus for manufacturing a tyre for a vehicle wheel, comprising:
    devices designed to form a green tyre;
    at least one vulcanisation mould, having holding walls defining an inner surface of a moulding cavity, said inner surface conforming in shape to the final conformation to be given to the green tyre, and
    said vulcanisation mould comprising a plurality of vent valves for said moulding cavity, at least one of said valves comprising:
        a duct having an inlet end opening onto said inner surface of said moulding cavity, and
        a closure member having a closing head that is axially movable relative to the duct between:
            a closed position, at which said closing head forms a contact seat with an inner wall of said duct, said contact seat being defined in said inlet end; and
            an open position, at which said closing head and inner wall of said duct confine a passage for connection with said moulding cavity, said closing head having at least one grip element to be mechanically engaged with the green tyre pressed against the inner surface of the moulding cavity in order to bring the closure member back to the open position when the tyre is separated from said inner surface.

2. The apparatus as claimed in claim 1, wherein said closing head is provided with a distal portion facing the moulding cavity and comprising said grip element.

3. The apparatus as claimed in claim 1, wherein said grip element delimits on said closing head, a grip recess designed to be engaged by the green tyre.

4. The apparatus as claimed in claim 3, wherein said grip recess is defined by an undercut.

5. The apparatus as claimed in claim 3, wherein said grip element comprises a frustoconical body having a minor base in engagement with said closing head and a side surface delimiting said grip recess.

6. The apparatus as claimed in claim 5, wherein said frustoconical body has a summit angle of 30° to 40°.

7. The apparatus as claimed in claim 1, wherein said contact seat is spaced apart from said inner surface of the moulding cavity so that an embedding recess is defined between the inner surface of the moulding cavity and the closing head of the closure member in the closed position.

8. The apparatus as claimed in claim 1, wherein the closing head has a peripheral edge and wherein, in the closed position, said peripheral edge forms said contact seat in a support plane that is offset relative to the inner surface of the moulding cavity.

9. The apparatus as claimed in claim 8, wherein said support plane is offset relative to the inner surface of the moulding cavity by an embedding distance of 0.15 mm to 0.25 mm.

10. The apparatus as claimed in claim 8, wherein in the open position of said closure member, the peripheral edge of the closing head projects relative to the inner surface of the moulding cavity by a separation distance smaller than 0.15 mm.

11. The apparatus as claimed in claim 8, wherein in the open position of said closure member, the peripheral edge of the closing head is offset relative to the support plane by an embedding distance that does not exceed a distance between said support plane and the inner surface of the moulding cavity.

12. The apparatus as claimed in claim 1, wherein the closing head has a convex surface facing the moulding cavity.

13. The apparatus as claimed in claim 12, wherein in the closed position, a distal portion of the convex surface is flush with the inner surface of the moulding cavity.

14. The apparatus as claimed in claim 12, wherein in the closed position, a distal portion of the convex surface projects relative to the inner surface of the moulding cavity.

15. The apparatus as claimed in claim 12, wherein in the closed position, a distal portion of the convex surface is housed in an embedding recess.

16. The apparatus as claimed in claim 12, wherein said convex surface has a frustoconical conformation.

17. The apparatus as claimed in claim 12, wherein a peripheral edge of the closing head lies in a plane which is offset relative to a distal portion of the convex surface by a predetermined distance of 0.1 mm to 0.15 mm.

18. The apparatus as claimed in claim 1, wherein the contact seat is defined by a circumferential line.

19. The apparatus as claimed in claim 1, wherein the inlet end of the duct diverges toward the moulding cavity according to a first angle.

20. The apparatus as claimed in claim 19, wherein the closing head has a tapered proximal portion having a second angle different from the first angle.

21. The apparatus as claimed in claim 1, wherein the inlet end diverges toward the moulding cavity following a curvilinear profile.

22. The apparatus as claimed in claim 1, wherein the inlet end diverges toward the moulding cavity following a frustoconical conformation.

23. The apparatus as claimed in claim 20, wherein said proximal portion of the closing head tapers according to a frustoconical conformation.

24. The apparatus as claimed in claim 20, wherein said proximal portion of the closing head tapers according to a curvilinear profile.

25. The apparatus as claimed in claim 19, wherein said first angle is 55° to 65°.

26. The apparatus as claimed in claim 20, wherein said second angle is 75° to 85°.

27. The apparatus as claimed in claim 20, wherein the closure member comprises an intermediate portion extending in the continuation of said proximal portion of the closing head.

28. The apparatus is claimed in claim 27, wherein said intermediate portion tapers according to a third angle having a smaller value than said second angle.

29. The apparatus as claimed in claim 28, wherein said third angle is 55° to 65°.

30. The apparatus as claimed in claim 1, wherein the duct is defined along a valve body mounted in an opening formed in a holding wall of the mould.

31. The apparatus as claimed in claim 1, comprising devices for pressing the tyre against the inner surface of the moulding cavity.

32. The apparatus as claimed in claim 1, comprising devices for separating the moulded tyre from the inner surface of the moulding cavity.

* * * * *